United States Patent
Sato

[11] Patent Number: 5,945,190
[45] Date of Patent: Aug. 31, 1999

[54] MAGNETIC RECORDING MEDIUM AND MAGNETIC DISK DEVICE

[75] Inventor: Kenji Sato, Kawasaki, Japan

[73] Assignee: Fujitsu Limited, Kawasaki, Japan

[21] Appl. No.: 08/907,655

[22] Filed: Aug. 8, 1997

[30] Foreign Application Priority Data

Feb. 17, 1997 [JP] Japan ................................. 9-031912

[51] Int. Cl.$^6$ ................................................. G11B 5/66
[52] U.S. Cl. .................... 428/65.3; 428/65.7; 428/336; 428/694 T; 428/694 TS; 428/900; 360/113; 324/252
[58] Field of Search ................. 428/336, 694 T, 428/694 TS, 900, 65.3, 65.7; 360/113; 324/252

[56] References Cited

U.S. PATENT DOCUMENTS

| | | | |
|---|---|---|---|
| 4,929,514 | 5/1990 | Natarajan et al. | 428/611 |
| 5,004,652 | 4/1991 | Lal | 428/611 |
| 5,024,903 | 6/1991 | Mizukami | 428/694 TS |
| 5,049,451 | 9/1991 | Lal | 428/611 |
| 5,057,200 | 10/1991 | Lal | 204/192.15 |

FOREIGN PATENT DOCUMENTS

| | | |
|---|---|---|
| 57-24031 | 2/1982 | Japan . |
| 59-88806 | 5/1984 | Japan . |
| 61-77125 | 4/1986 | Japan . |
| 61-240434 | 10/1986 | Japan . |
| 1256017 | 10/1989 | Japan . |
| 258723 | 2/1990 | Japan . |
| 2154323 | 6/1990 | Japan . |
| 2161617 | 6/1990 | Japan . |
| 2162526 | 6/1990 | Japan . |
| 4221418 | 8/1992 | Japan . |
| 4228105 | 8/1992 | Japan . |
| 5189738 | 7/1993 | Japan . |
| 7050008 | 2/1995 | Japan . |
| 750008 | 2/1995 | Japan . |

*Primary Examiner*—Leszek Kiliman
*Attorney, Agent, or Firm*—Greer, Burns & Crain, Ltd.

[57] ABSTRACT

A magnetic recording medium comprising a nonmagnetic substrate; and, provided on the nonmagnetic substrate in the following order: an underlayer comprising chromium as a major component and molybdenum as a minor component; and a recording layer comprising 56 to 78 at % of cobalt, 14 to 22 at % of chromium, 4 to 20 at % of platinum, and a sum of 0.5 to 4 at % of tantalum and niobium, the recording layer having a tBr (a product of the thickness t and the residual magnetization density Br of the recording layer) of 40 to 200 G.μm. A longitudinal magnetic recording medium is provided which has high coercive force, contributing to a high reproduction output, and, at the same time, a low noise level.

8 Claims, 9 Drawing Sheets

MAGNETIC RECORDING MEDIUM AND MAGNETIC DISK DEVICE

BACKGROUND OF THE INVENTION

1. Field of the Invention

The present invention relates to a magnetic recording medium and more particularly to a magnetic recording medium which can realize high-density recording by virtue of high coercive force and, in addition, has an improved S/N ratio by virtue of a reduced medium noise level while maintaining a highly reproduced output. The present invention also relates to a magnetic disk device, for recording and reproducing information, using the magnetic recording medium.

2. Description of the Related Art

The development of information processing techniques has led to an increasing demand for an increase in density of magnetic disk devices used in external storages of computers. Specifically, in the reproducing head of the magnetic disk devices, the use of a magnetoresistive head utilizing a magnetoresistor, or MR head, has been proposed instead of the conventional wire wound-type inductive thin film magnetic head. In an MR head, the electric resistance changes in response to the magnetic field intensity. The MR head is also characterized by magnetoresistance effects, which are changes in electric resistance produced in a magnetic material upon application of an external magnetic field, for the reproduction of a signal on a recording medium. An MR head also has a reproduction output margin that is several times larger than that of the conventional inductive thin film magnetic head. In the conventional head, the inductance is small and a large S/N ratio can be expected. Further, the use of an AMR (anisotropic magnetoresistive) head utilizing anisotropic magnetoresistance, a GMR (giant magnetoresistive) head utilizing giant magnetoresistance, and a practical variant, a spin valve GMR head, besides the MR head, have also been proposed.

Further, in order to meet the demand for high-density recording, a sufficient improvement in properties of a MR head, AM head, or GMR head (including spin valve head) have been demanded. In particular, low tBr (a product of the thickness t and the residual magnetization density Br of a magnetic recording layer), low noise level, and high coercive force Hc are required of the magnetic recording medium. In order to meet such requirements, the prior art, for example, Japanese Unexamined Patent Publication (Kokai) No. 1-256017, discloses a magnetic recording medium comprising a nonmagnetic substrate, a chromium layer (thickness=100 nm) as an underlayer provided on the nonmagnetic substrate, and a magnetic layer (thickness=60 nm) provided on the chromium layer, the magnetic layer being formed of a CoCrTaPt-base four-component alloy and having a combination of a low noise level typically derived from CoCrTa-base alloy with high coercive force typically derived from CoCrPt-base alloy. U.S. Pat. No. 5,004,652 (corres. to Japanese Unexamined Patent Publication (Kokai) No. 4-228105) discloses a magnetic recording medium comprising a nonmagnetic substrate and a chromium layer (thickness=about 30–300 nm) and a magnetic layer of a CoCrPtTa four-component alloy (thickness=about 20–100 nm) formed in that order by sputtering on the nonmagnetic substrate. Further, Japanese Unexamined Patent Publication (Kokai) No. 5-72016 discloses a process for producing a magnetic recording medium, wherein a magnetic metallic thin layer is sputtered on a substrate. The above patent publications teach useful means for enhancing the coercive force of a magnetic recording medium. However, no consideration is given to a reduction in noise level which is one of the objects of the present invention.

Japanese Unexamined Patent Publication (Kokai) NO. 7-50008 teaches a magnetic recording medium which can simultaneously satisfy both property requirements of high coercive force and low noise level. Specifically, the magnetic recording medium taught in this publication comprises a nonmagnetic substrate layer and a magnetic layer provided on the nonmagnetic substrate layer through a nonmagnetic metal underlayer (thickness=100 to 3000 Å) of chromium or a chromium alloy, the magnetic layer being formed of an alloy containing 60 to 80 at % cobalt, 5 to 20 at % chromium, 1 to 20 at % platinum, and 0.5 to 6 at % at least one member selected from the group consisting of niobium, hafnium, tungsten, titanium, and tantalum. According to this invention, not only a high coercive force of 1610 to 1750 Oe (Examples 1 to 7) but also a low noise level can be achieved. Further, Japanese Unexamined Patent Publication (Kokai) No. 7-50009 discloses a magnetic recording medium wherein a thin layer medium of an alloy of 95 to 60 at % chromium and at least one member, in an amount of 5 to 40 at %, selected from molybdenum and tungsten is used as an underlayer for a magnetic layer having a single layer structure of a CoCrPt alloy. This magnetic recording medium also can realize simultaneously high coercive force and a low noise level. Specifically, the use of a chromium layer containing 28 at % molybdenum as the underlayer results in about 10% reduction in noise as compared with an underlayer consisting of chromium alone. The techniques taught in these publications, however, have problems remaining unsolved. For example, the magnetic recording medium described in Japanese Unexamined Patent Publication (Kokai) No. 7-50008, as specifically demonstrated in working examples, can provide higher coercive force (Hc≧1500 Oe) than the comparative magnetic recording medium. The coercive force, however, is in the range of from 1610 to 1750 Oe at the highest. It is therefore desired to provide a magnetic recording medium which can provide coercive force Hc≧2000 Oe. Regarding tBr, the magnetic recording medium described in the above publication, as demonstrated in working examples, provides a value in the range of from 320 to 340 G.μm which is unsatisfactory for coping with an increase in density a higher level of which is expected to be demanded in the future. It is therefore desired to provide a magnetic recording medium which has a tBr of 200 G.μm at the highest

SUMMARY OF THE INVENTION

A first object of the present invention is to provide a magnetic recording medium having high coercive force contributing to high reproduction output and, at the same time, capable of providing a lowered noise level, and a magnetic recording medium having an improved S/N ratio by virtue of improved noise level while maintaining a high reproduction output.

A second object of the present invention is to provide a magnetic disk device using the above magnetic recording medium according to the present invention.

Other objects of the present invention will be easily understood from the following detailed description.

According to one aspect of the present invention, there is provided a magnetic recording medium comprising a nonmagnetic substrate; and, provided on the nonmagnetic substrate in the following order, an underlayer of a nonmagnetic material and a recording layer of a magnetic material, the underlayer comprising chromium as a major component and molybdenum as a minor component, the recording layer comprising the following constituents:

| | |
|---|---|
| cobalt | 56 to 78 at % |
| chromium | 14 to 22 at % |
| platinum | 4 to 20 at % |
| sum of tantalum and niobium | 0.5 to 4 at %, | the recording layer having a coercive force of more than 2000 Oe, i.e., Hc>2000 Oe the recording layer having a tBr (a product of the thickness t and the residual magnetization density Br of the recording layer) of 40 to 200 G.μm.

According to another aspect of the present invention, there is provided a magnetic disk device comprising a recording head section for recording information in a magnetic recording medium; and a reproducing head section for reproducing information, wherein the magnetic recording medium is one according to the present invention and the reproducing head section is provided with a magnetoresistive head.

DESCRIPTION OF THE PREFERRED EMBODIMENTS

Figure 1:
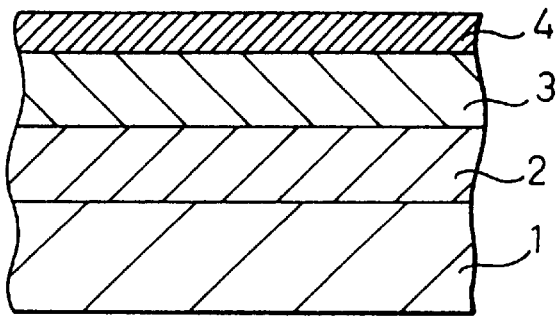
FIG. 1 is a cross-sectional view showing one preferred embodiment of the magnetic recording medium according to the present invention.

As described above, the magnetic recording medium according to the present invention comprises: a nonmagnetic substrate; and, provided on the nonmagnetic substrate in the following order, an underlayer of a nonmagnetic material and a recording layer of a magnetic material, and has a typical layer construction as shown in FIG. 1 (cross-sectional view). Specifically, as shown in the drawing, the magnetic recording medium according to the present invention may comprise a nonmagnetic substrate 1 and, provided on the nonmagnetic substrate 1 in the following order, an underlayer 2 formed of cobalt and molybdenum as a nonmagnetic metal material and a magnetic recording layer layer 3 formed of a particular magnetic metal material. In the drawing, a protective layer 4, which may be optionally provided in the present invention, is provided on the magnetic recording layer 3.

In the magnetic recording medium of the present invention, the nonmagnetic underlayer to be provided on the nonmagnetic substrate comprises chromium as a major component with molybdenum as a minor component added thereto. The underlayer preferably has a thickness of 15 to 60 nm.

The magnetic recording layer to be provided on the nonmagnetic underlayer comprises a five-component alloy of cobalt, chromium, platinum, tantalum, and niobium, and the chemical composition of the alloy is as follows:

cobalt: 56 to 78 at % chromium: 14 to 22 at % platinum: 4 to 20 at % sum of tantalum and niobium: 0.5 to 4 at %.

Further, in the magnetic recording layer, the coercive force is Hc>2000 Oe, and tBr (a product of the thickness t and the residual magnetization density Br of the recording layer) is in the range of from 40 to 200 G.μm. As described above, tantalum and niobium are contained in a sum of at most 4 at %. In this case, preferably, tantalum and niobium are contained in the same amount.

The underlayer and the magnetic recording layer may be formed by various film forming methods commonly used in the art. However, layer formation by sputtering under the application of a DC negative bias of −70 to −400 V is preferred. According to a preferred embodiment of the present invention, the nonmagnetic substrate is constructed of an NiP-plated aluminum disk, and the magnetic recording layer is formed by sputtering at a layer forming temperature of 220 to 320° C.

The present invention which has been summarized above has been accomplished as a result of extensive and intensive studies on the problems of the prior art. Specifically, the present inventors have studied the chemical composition of the conventional CoCrPt-based magnetic layer containing tantalum and niobium, particularly the chemical composition of a CoCrPtTaNb-based magnetic layer described in Japanese Unexamined Patent Publication (Kokai) No. 7-50008 noted above. As a result, they have found that although the composition of the magnetic layer which has been specifically described in a working example of this publication, $Co_{75.8}Cr_{12.5}Pt_{7.7}Ta_2Nb_2$ (provided on an underlayer of chromium), can simultaneously satisfy both property requirements of high coercive force and low noise level, there is room for an improvement in magnetic properties and electromagnetic conversion properties and that, in such a magnetic recording layer of a five-component alloy, the construction of the underlayer out of a CrMo alloy and, in addition, an increase in chromium content of the chemical composition of the magnetic layer according to the present invention result in a further improvement in these properties. Further, they have found that, regarding a magnetic head used in combination with the magnetic recording medium, the magnetic head used in the working example of Japanese Unexamined Patent Publication (Kokai) No. 7-50008, because it is an inductive head (MIG head), can provide only properties of tBr: 330 G.$\mu$m and Hc: 1720 Oe, as specifically described in the working example, which are unsatisfactory for high density recording of not less than 1 Gb/in$^2$. Furthermore, they have noticed that the layer forming temperature is 230° C., i.e., a relatively low temperature, and the application of a DC bias in the layer formation is not proposed.

Contrary to this, in the magnetic recording layer of the magnetic recording medium according to the present invention, the magnetic properties can be regulated by varying the chemical composition, layer forming method, layer forming conditions and the like. In fact, according to the present invention, the S/N ratio of the medium, a measure of the properties of a recording medium, can be brought to not less than 30 dB. Further, when magnetron sputtering is used in the layer formation, the formation of the recording layer at a layer forming temperature of 215° C. or above under the application of a DC bias of −80 to −400 V enables the magnetic properties of the medium in the direction of the advance of the head to be brought to Hc: 2500 Oe, S: 0.8, and S*: 0.8.

The nonmagnetic underlayer in the magnetic recording medium according to the present invention is constituted from a CrMo alloy. The addition of molybdenum to chromium in the substrate layer can increase the lattice face spacing of the underlayer. When the composition of the underlayer is varied so as to permit the lattice face spacing of the underlayer to be made close to the lattice face spacing, of the recording layer, increased by the composition of the recording layer, particularly the platinum content thereof, preferential longitudinal orientation of the C axis of the recording layer of CoCr can be promoted, which is demonstrated by X-ray diffraction pattern analysis [a diffraction peak derived from Co (110) becoming large], indicating that the coercive force Hc can be improved. Further, according to the present inventors' finding, the S/N ratio can be effectively enhanced by bringing the thickness of the underlayer to 15 to 60 nm.

Thus, according to the magnetic recording medium of the present invention, the recording density can be increased as a result of enhancement of the S/N ratio. A reduction of the noise level, attained by addition of both tantalum and niobium to a three-component alloy of CoCrPt and, in addition, optimization of the layer construction and the layer formation process contribute greatly to this effect.

The magnetic recording medium of the present invention will be further described in more detail.

In the magnetic recording medium of the present invention, the nonmagnetic substrate may be made of various substrate materials commonly used in the art. Suitable substrate materials include, but are not limited to, for example, NiP-plated aluminum (including aluminum alloys) disks, glass or tempered glass disks, single crystal silicon disks or silicon disks having a surface oxidized coating (for example, a silicon oxide coating), SiC disks, carbon disks, plastic disks, and ceramic disks.

An underlayer provided on the nonmagnetic substrate may be made of a chromium/molybdenum alloy commonly used in the art. Preferably, this underlayer may be formed, for example, by sputtering, such as magnetron sputtering, under conventional layer forming conditions. Suitable layer forming conditions are, for example, layer forming temperature of about 100–300° C., argon gas pressure of about 1–10 mTorr, and bias voltage of about −70 to −400 V. If necessary, instead of sputtering, other layer forming methods, for example, ion beam sputtering, may be used. The thickness of the substrate layer may be widely varied depending upon various factors. It, however, is preferably 15 to 60 nm.

As described above, the magnetic recording layer provided on the nonmagnetic substrate through the underlayer is constituted from a five-component alloy of CoCrPtTaNb. Preferably, such a magnetic recording layer may be advantageously formed by sputtering under specific layer forming conditions. As in the formation of the underlayer, sputtering may be, for example, magnetron sputtering. Suitable layer forming conditions are, for example, layer forming temperature of about 100–350° C., argon gas pressure of about 1–10 mTorr, and bias voltage of about −70 to −400 V. If necessary, instead of sputtering, other film forming methods, for example, ion beam sputtering, may be used.

The magnetic recording layer may generally have a single layer structure. If necessary, it may have a multi-layer structure of two or more mutually separated recording layers. That is, the magnetic recording layer may optionally take a multi-layer structure. In this case, the magnetic layers may be separated from each other through a nonmagnetic intermediate layer interposed between the respective two magnetic layers. Suitable nonmagnetic intermediate layers include, for example, a CrMo layer.

Further, according to the present inventors' finding, in practicing the present invention, optimal layer forming conditions may be selected for each selected substrate. For example, when the nonmagnetic substrate is an NiP-plated aluminum disk, the magnetic recording film may be advantageously formed from cobalt, chromium, platinum, tantalum, and niobium by sputtering at a layer forming temperature of 220 to 320° C.

If necessary, the magnetic recording medium of the present invention may further comprise, as an outermost layer and usually on the above-mentioned magnetic recording layer, a protective layer frequently adopted in the art. Suitable protective layers include, for example, a layer consisting of carbon alone and layers of carbon compounds, for example, C layer, WC layer, SiC layer, $B_4C$ layer, and hydrogen-containing C layer. In particular, a protective film of carbon can be advantageously used in the practice of the present invention. The above protective layer may be formed by the conventional method, for example, by sputtering or chemical vapor deposition (CVD). The thickness of the protective layer may be widely varied depending upon various factors. It, however, is preferably about 5 to 15 nm.

In the magnetic recording medium of the present invention, in addition to the above-described indispensable layers and optional layers, additional layers commonly used in the art may be provided. Otherwise, the layers constituting the magnetic recording medium may be optionally subjected to chemical treatment or the like. For example, the protective layer may have thereon a lubricant layer comprising a fluorocarbon resin or alternatively may be subjected to treatment for imparting the same effect attained by the lubricant layer.

According to another aspect of the present invention, there is provided a magnetic disk device using the magnetic recording medium of the present invention described above and described below in detail. The structure of the magnetic disk device of the present invention is not particularly limited. Basically, however, the device comprises: a recording head section for recording information in a magnetic recording medium; and a reproducing head section for reproducing information. In particular, as will be described below, the reproducing head section is preferably provided with a magnetoresistive head using a magnetoresistor wherein the electric resistance changes in response to the magnetic field intensity, that is, an MR (magnetoresistive) head.

Preferably, the magnetic disk device of the present invention has a magnetoresistor and a conductor layer for supplying a sense current into the magnetoresistor, and a composite magnetic head comprising a lamination of a magnetoresistive reproducing head, for reading information from the magnetic recording medium, and an induction type recording head, for recording information on the magnetic recording medium, having a pair of thin film electrodes may be used. Magnetoresistive reproducing heads usable herein may have various structures known in the art and preferably include AMR (anisotropic magnetoresistive) heads utilizing anisotropic magnetoresistance effects and GMR (giant magnetoresistive) heads utilizing giant magnetoresistance effects (including spin valve GMR head and the like). The conductor layer of the reproducing head may have various constructions. However, preferred conductor layers include:

1. a conductor layer having a thickness in the vicinity of the magnetoresistor that is relatively small with respect to its thickness in other portions of the conductor layer; and
2. a conductor layer wherein the thickness and the width of the conductor layer in the vicinity of the magnetoresistor are relatively small with respect to its thickness and width in other portions of the conductor layer. The thickness and optionally the width of the conductor layer to satisfy the above construction requirements may be regulated by various methods. A particularly recommendable method for such regulation is to increase the thickness by forming the conductor layer so as to have a multi-layer structure.

As compared with a conventional composite magnetic head (a magnetic head comprising a combination of a magnetoresistive reproducing head for reading information with an induction type recording head for recording information), a magnetic disk device particularly having the above construction can reduce the curving of the magnetic pole of the recording head section and, at the same time, can reduce the resistance of the conductor layer and, when the off-track error is small, can read information with high accuracy and sensitivity.

Figure 2:
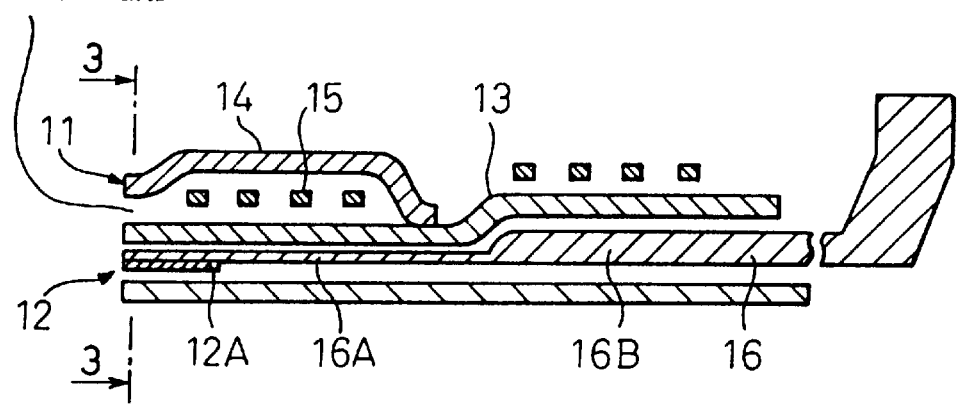
FIG. 2 is a cross-sectional view showing the principal of the magnetic disk device according to the present invention.
Figure 3:
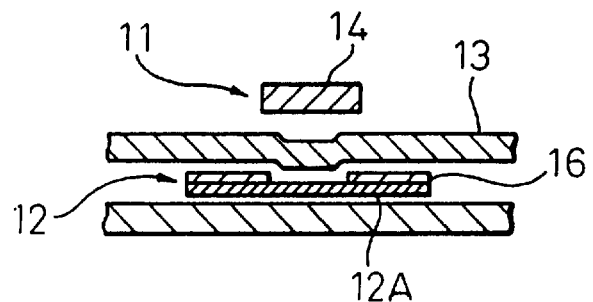
FIG. 3 is a cross-sectional view taken on line B—B of the magnetic disk device shown in FIG. 2.

In the magnetic disk device of the present invention, preferably, the recording head section and the reproducing head section each may have a laminate structure as shown in FIGS. 2 and 3. FIG. 2 shows a diagram showing the principle of the magnetic disk device of the present invention, and FIG. 3 is a cross-sectional view taken on line B—B of FIG. 2.

In FIGS. 2 and 3, numeral 11 designates an induction type recording head section for recording information on a magnetic recording medium, and numeral 12 a magnetoresistive reproducing head section for reading information. The recording head section 11 comprises: a lower magnetic pole (an upper shield layer) 13 of NiFe or the like; an upper magnetic pole 14, of NiFe or the like, which faces the lower magnetic pole 13 while leaving a certain space; and a coil 15 for exciting the magnetic poles 13, 14 and permitting information recording on the magnetic recording medium to be conducted in a recording gap section.

The reproducing head section 12 is preferably constituted by an AMR head, a GMR head or the like. On a magnetoresistor section 12A are provided a pair of conductor layers 16, for supplying a sense current into the magnetoresistor 12A, while leaving a space, corresponding to the width of a recording track, between the two conductor layers. In this case, the thickness of the conductor layers 16 is such that thickness of a portion 16A in the vicinity of the magnetoresistor section 12A is small with the thickness of the other portion 16B being large.

In the constructions shown in FIGS. 2 and 3, since the thickness of the conductor layer 16 is small in the portion 16A in the vicinity of the magnetoresistor section 12A, the curving of the lower magnetic pole (upper shield layer) 13 and the like is small. By virtue of this, the recording gap facing the magnetic recording medium is also not significantly deformed. Therefore, even though the position, on a track, of the magnetic head at the time of information recording is somewhat different from the position, on the track, of the magnetic head at the time of reading of the information, the magnetic disk device can accurately read information, making it possible to avoid a problem that reading errors occur despite a small off-track error.

On the other hand, since the thickness of the conductor layer 16 is large in the portion 16B other than that in the vicinity of the magnetoresistor section 12A, the resistance of the whole conductor layer 16 can be reduced. As a result, a change in resistance of the magnetoresistor section 12A can be detected with a high sensitivity, resulting in improved S/N ratio. Further, generation of heat in the conductor layer 16 can also be avoided, preventing the creation of noise attributable to the generation of heat.

EXAMPLES

Figure 4:
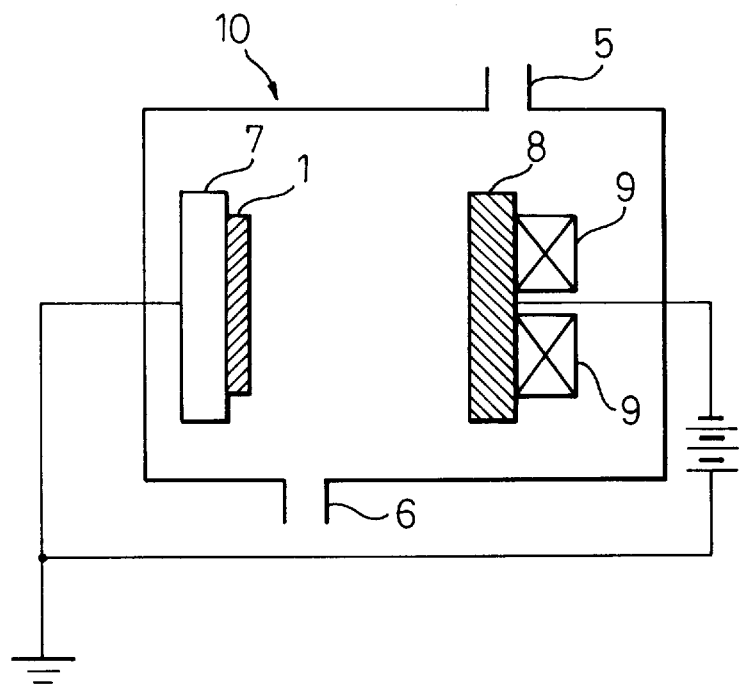
FIG. 4 is a schematic diagram showing the construction of a DC magnetron sputtering system used in the formation of the magnetic recording medium according to the present invention.

The present invention will be described in more detail with reference to the following typical examples. However, it should be understood that the present invention is not limited to these examples only. In the following examples, a DC magnetron sputtering system as shown in FIG. 4 was used to form an underlayer, a magnetic recording layer, and a protective layer. As shown in the drawing, a sputtering system 10 has an argon inlet 5 for introducing an argon gas into a sputtering chamber, an outlet 6, a susceptor 7 for supporting a disk substrate 1, a target 8, and a magnet 9. A vacuum of about 1 to 10 Torr can be applied to the sputtering chamber of the system.

Example 1
Production of Magnetic Recording Medium

An underlayer of $CrMo_{10}$ (at %), a recording layer of a $CoCr_{17}Pt_5$ (at %)-based material, and a protective layer of carbon were deposited, in that order, on an NiP/Al disk substrate having a thoroughly cleaned, textured surface, using a DC magnetron sputtering system. In this case, a sputtering chamber was evacuated to not more than $3\times10^{-7}$ Torr prior to the formation of the underlayer, the substrate was heated to 280° C., an argon gas was introduced to maintain the inside of the sputtering chamber at 5 mTorr, and the underlayer was formed in various thicknesses (10 to 60 nm) under the application of a bias voltage of 0 to −400 V. Subsequently, a CoCrPtTaNb layer was formed in various compositions onto the underlayer of CrMo so as to give tBr=100 G.μm (corresponding to a thickness of 27 nm). The composition of the recording layer of CoCrPtTaNb was varied by using a composite target, wherein platinum, tantalum and niobium chips were placed on a $Co_{74}Cr_{17}$ (at %) target.

Various conditions were applied to evaluate the relationship between the composition of the recording layer and the magnetic properties and other relationships. In evaluation tests, an energy dispersive compositional analyzer (Energy Dispersion Spectroscopy; EDS) was used for the analysis of the composition, while a vibrating sample magnetometer (VSM) was used for magnetic measurements. Details of the evaluation tests and the results of the tests will be described.

Figure 5:
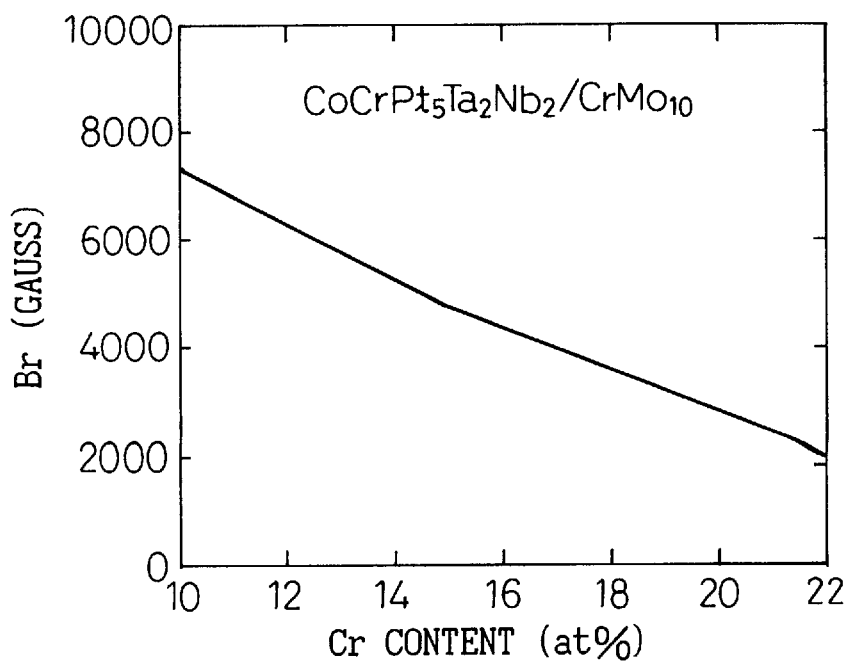
FIG. 5 is a graph showing the dependency of the residual magnetization Br (G) of a recording layer of CoCrPt$_5$Ta$_2$Nb$_2$ (at %) upon the chromium content.

Evaluation Test 1
Dependency of Residual Magnetization Br (G) of Recording Layer of $CoCrPt_5Ta_2Nb_2$ (at %) upon Chromium Content A recording layer of $CoCrPt_5Ta_2Nb_2$ (at %) was formed in various chromium contents on an underlayer of $CrMo_{10}$. The residual magnetization Br (G) was measured for each recording layer. The results are shown as a graph in FIG. 5. As can be seen from the results, the residual magnetization linearly changes with the chromium content. It is also apparent that the regulation of the chromium content to not more than 20 at % is necessary for maintaining Br=2000 G, a measure of the residual magnetization density.

Figure 6:
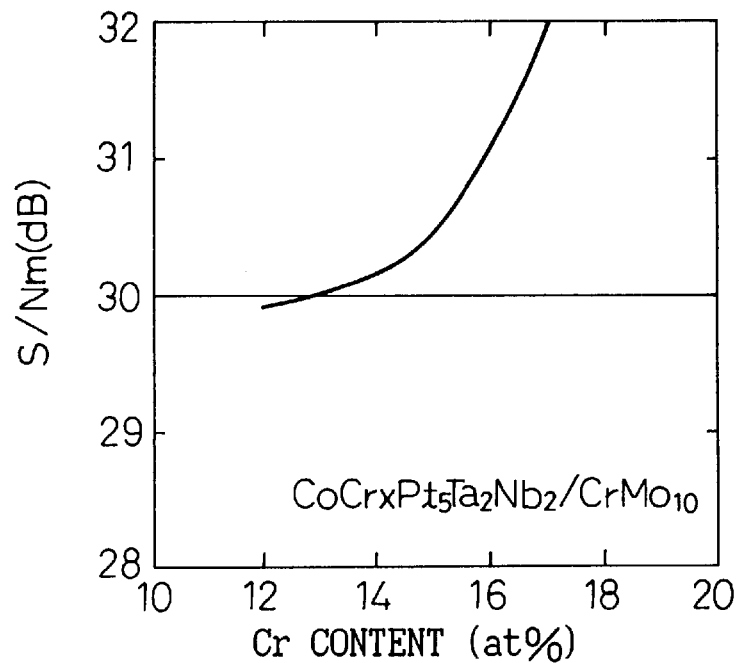
FIG. 6 is a graph showing the dependency of S/N (dB) of a magnetic recording medium having a recording layer of CoCrPt$_5$Ta$_2$Nb$_2$ (at %) upon the chromium content.

Evaluation Test 2
Dependency of S/N (dB) of Magnetic Recording Medium having Recording Layer of $CoCrPt_5Ta_2Nb_2$ (at %) upon Chromium Content A recording layer of $CoCrPt_5Ta_2Nb_2$ (at %) was formed in various chromium contents on an underlayer of $CrMo_{10}$. S/N (dB) of the medium was measured for each recording layer. The results are shown as a graph in FIG. 6. As can be seen from the results, the S/N of the medium increases with increasing chromium content. It is also apparent that the regulation of the chromium content to not less than 14 at % is necessary to obtain the required S/N of 30 dB.

Figure 7:
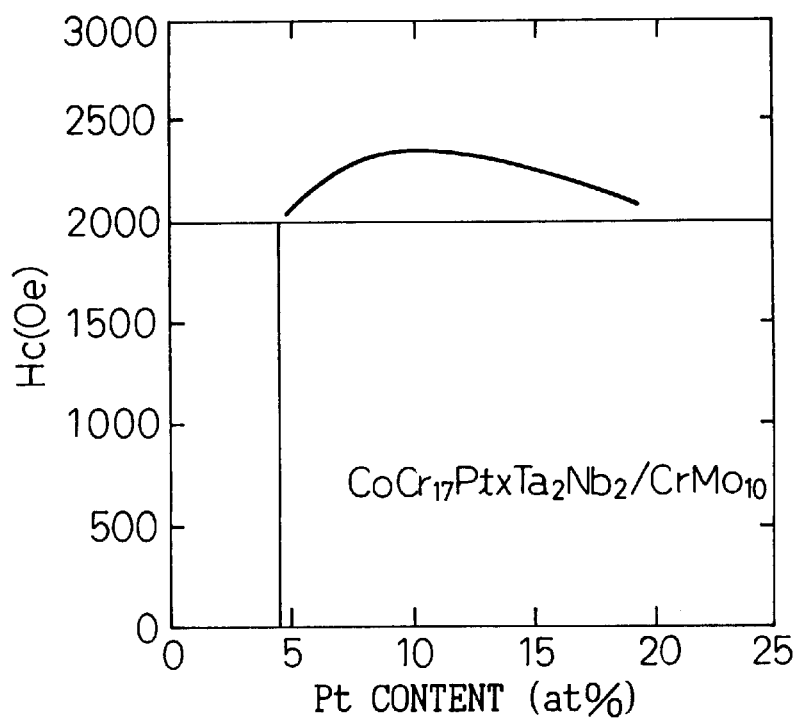
FIG. 7 is a graph showing the dependency of coercive force Hc (Oe) of a recording layer of CoCr$_{17}$PtTa$_2$Nb$_2$ (at %) upon the platinum content.

Evaluation Test 3
Dependency of Coercive Force Hc (Oe) of Recording Layer of $CoCr_{17}PtTa_2Nb_2$ (at %) upon Platinum Content A recording layer of $CoCr_{17}PtTa_2Nb_2$ (at %) was formed in various platinum contents on an underlayer of $CrMo_{10}$. The coercive force Hc (Oe) was measured for each recording layer. The results are shown as a graph in FIG. 7. As can be seen from the results, the maximum coercive force Hc is provided when the platinum content is around 10 at %. It is also apparent that the platinum content should be in the range of from 4 to 20 at % in order to obtain a coercive force Hc of not less than 2000 Oe.

Figure 8:
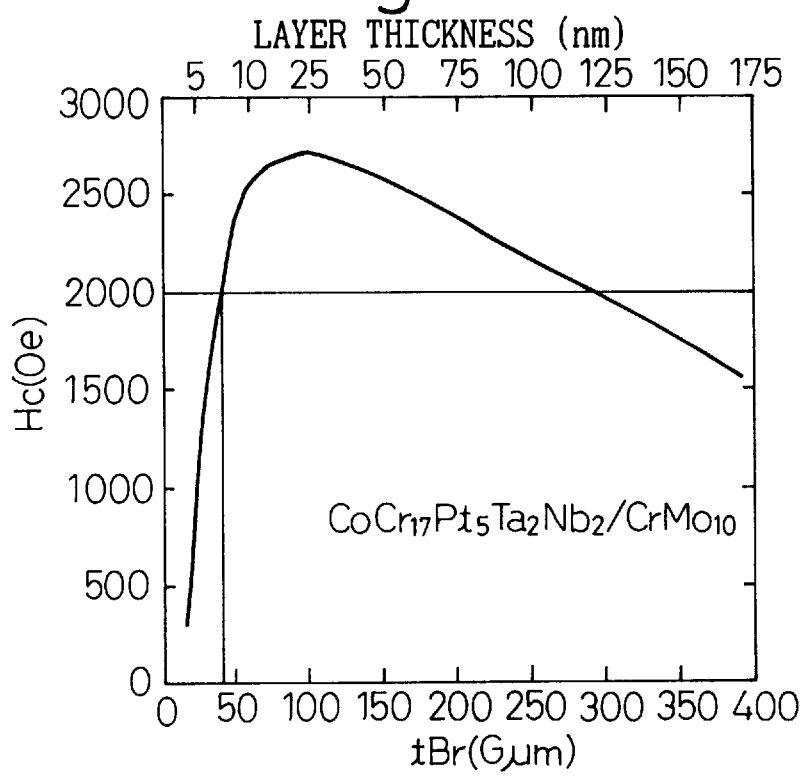
FIG. 8 is a graph showing the dependency of coercive force Hc (Oe) of a recording layer of CoCr$_{17}$Pt$_5$Ta$_2$Nb$_2$ (at %) upon tBr/layer thickness.

Evaluation Test 4
Dependency of Coercive Force Hc (Oe) of Recording Layer of $CoCr_{17}Pt_5Ta_2Nb_2$ (at %) upon tBr/Layer Thickness A recording layer of $CoCr_{17}Pt_5Ta_2Nb_2$ (at %) was formed on an underlayer of $CrMo_{10}$ to determine a change in coercive force Hc (Oe) as a function of tBr (G.μm) and, therefore, layer thickness (nm). The results are shown as a graph in FIG. 8. As can be seen from the results, the maximum coercive force Hc is provided at a tBr of around 100 G.μm (corresponding to a layer thickness of about 25 nm), and the coercive force Hc linearly decreases with increasing tBr from around 100 G.μm. It is also apparent that a tBr of not more than 40 G.μm unfavorably brings the coercive force Hc to not more than 2000 Oe, making it impossible to maintain the necessary coercive force.

Figure 9:
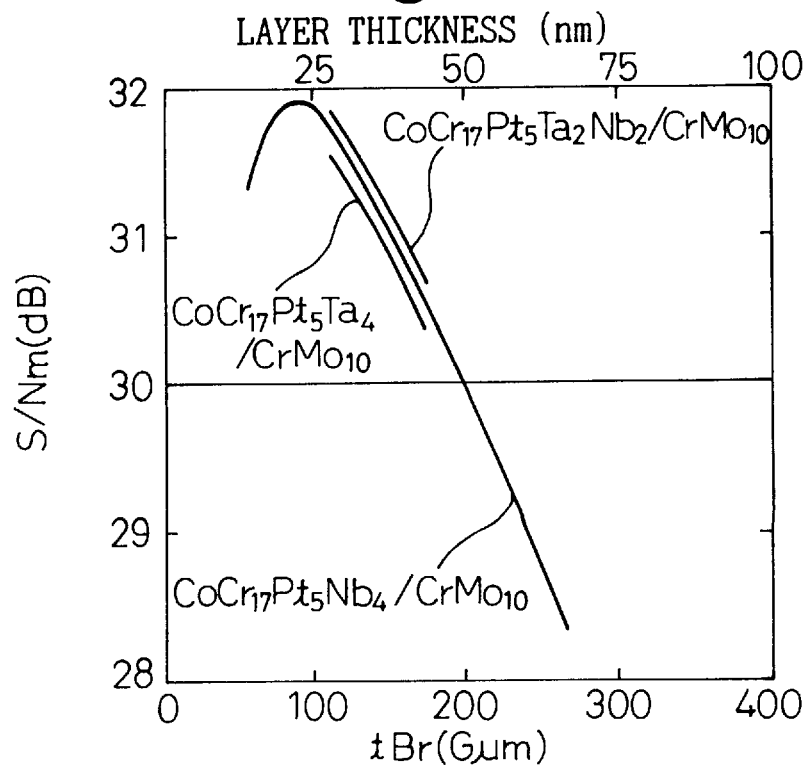
FIG. 9 is a graph showing the dependency of S/N (dB) of a magnetic recording medium having a recording layer of CoCr$_{17}$Pt$_5$Ta$_2$Nb$_2$ (at %) or other recording layer upon tBr/layer thickness.

Evaluation Test 5
Dependency of S/N (dB) of Magnetic Recording Medium having Recording Layer of $CoCr_{17}Pt_5Ta_2Nb_2$ (at %) or other Recording Layer upon tBr/Layer Thickness A recording layer of $CoCr_{17}Pt_5Ta_2Nb_2$ (at %) was formed on an underlayer of $CrMo_{10}$. Further, for comparison, a recording layer of $CoCr_{17}Pt_5Ta_4$ and a recording layer of $CoCr_{17}Pt_5Nb_4$ were formed on the underlayer of $CrMo_{10}$. For each recording layer, a change in S/N (dB) of the medium as a function of tBr (G.μm) and, therefore, layer thickness (nm) was determined. The results are shown as a graph in FIG. 9. As can be seen from the results, for the recording layer according to the present invention, the maximum S/N of the medium is provided at tBr around 100 G.μm (corresponding to a layer thickness of about 25 nm), and the S/N of the medium substantially linearly decreases with increasing tBr from around 100 G.μm. It is also apparent that a tBr of not more than 200 G.μm is necessary to obtain the necessary S/N ratio of 30 dB.

Figure 10:
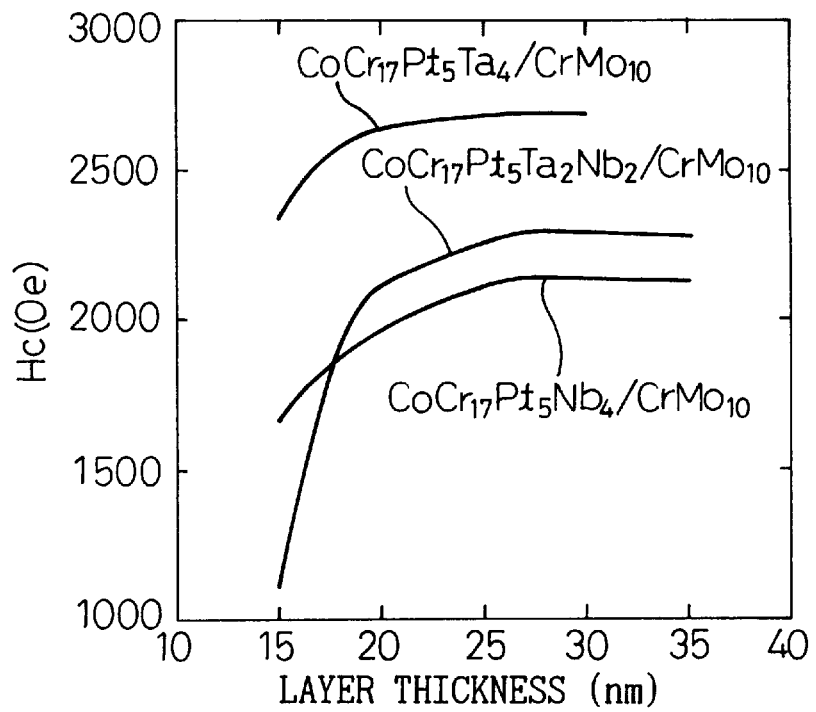
FIG. 10 is a graph showing the dependency of coercive force Hc (Oe) of a recording layer of CoCr$_{17}$PtTa$_2$Nb$_2$ (at %) or other recording layer upon layer thickness.

Evaluation Test 6
Dependency of Coercive Force Hc (Oe) of Recording Layer of $CoCr_{17}Pt_5Ta_2Nb_2$ (at %) or other Recording Layer upon Layer Thickness A recording layer of $CoCr_{17}Pt_5Ta_2Nb_2$ (at %) was formed on an underlayer of $CrMo_{10}$. Further, for comparison, a recording layer of $CoCr_{17}Pt_5Ta_4$ and a recording layer of $CoCr_{17}Pt_5Nb_4$ were formed on the underlayer of $CrMo_{10}$. For each recording layer, a change in coercive force Hc (Oe) as a function of the layer thickness (nm) was determined. The results are shown as a graph in FIG. 10. As can be seen from the results, for the recording layer according to the present invention, substitution of same of the tantalum in $CoCr_{17}Pt_5Ta_4$ with niobium permits the coercive force Hc to be controlled (2000 to 2500 Oe) while maintaining good O/W properties without sacrificing the S/N ratio.

Figure 11:
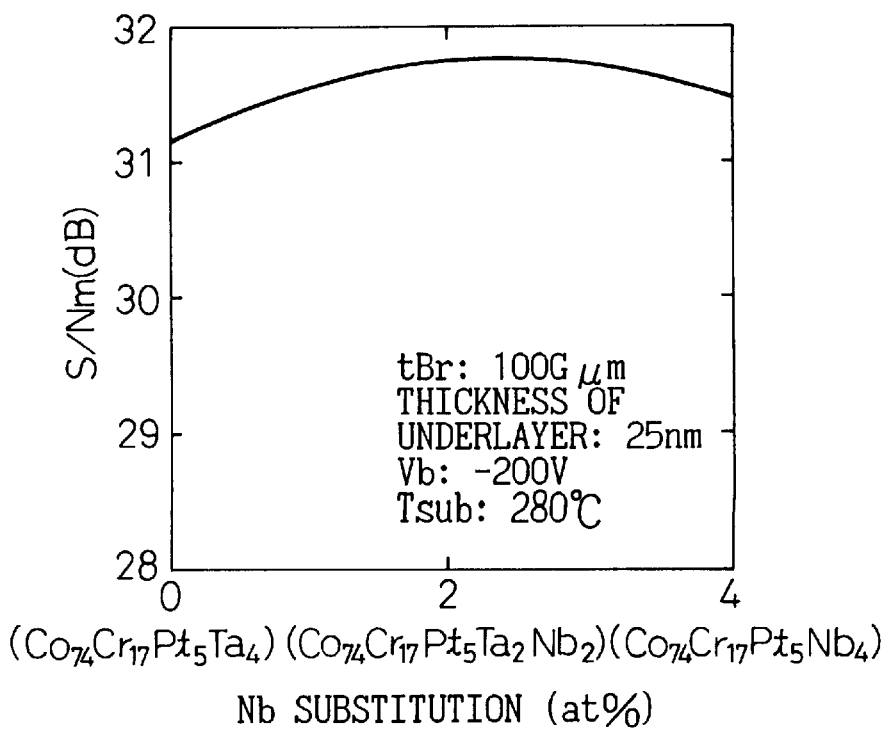
FIG. 11 is a graph showing the dependency of S (solitary wave)/N of a recording layer of Co$_{74}$Cr$_{17}$Pt$_5$Ta$_x$Nb$_y$ (x+y=4) (at %) upon the proportion of tantalum and niobium added.

Evaluation Test 7
Dependency of S (solitary wave)/N of Recording Layer of $Co_{74}Cr_{17}Pt_5Ta_xNb_y$ (x+y=4) (at %) upon Proportion of Tantalum and Niobium Added A recording layer of $Co_{74}Cr_{17}Pt_5Ta_xNb_y$ (x+y=4) (at %) with x and y values being varied was formed on a 25 nm-thick underlayer of $CrMo_{10}$. For each recording layer, a change in S (solitary wave)/N (dB) of the medium as a function of the proportion of tantalum and niobium added was determined. The results are shown as a graph in FIG. 11. As can be seen from the results, the maximum S (solitary wave)/N is provided at a niobium substitution of around 2 to 2.5 at % (tantalum: 1.5 to 2 at %).

Figure 12:
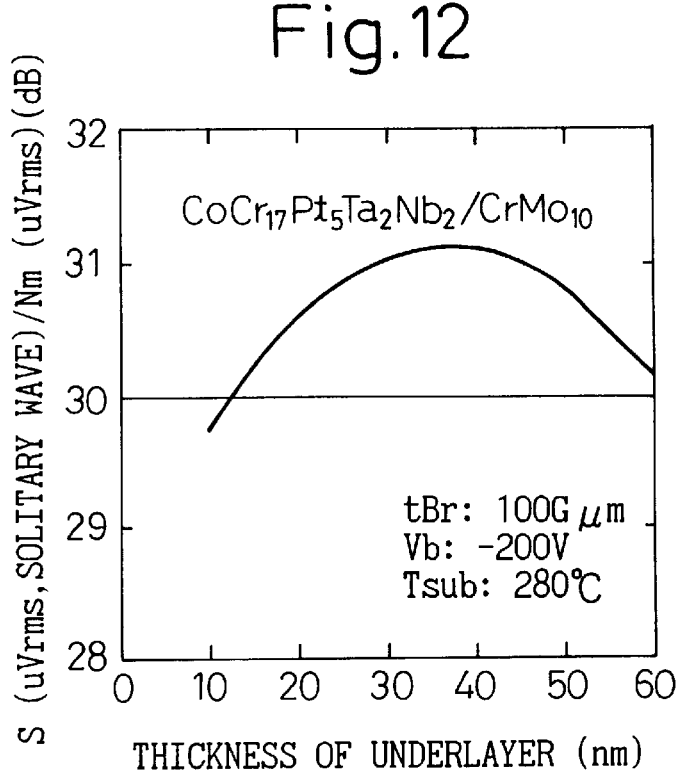
FIG. 12 is a graph showing the dependency of S (solitary wave)/N of a recording layer of CoCr$_{17}$Pt$_5$Ta$_2$Nb$_2$ (at %) upon the thickness of an underlayer.

Evaluation Test 8
Dependency of S (solitary wave)/N of Recording Layer of $CoCr_{17}Pt_5Ta_2Nb_2$ (at %) upon Thickness of Underlayer A recording layer of $CoCr_{17}Pt_5Ta_2Nb_2$ (at %) was formed on an underlayer of $CrMo_{10}$ with varied layer thickness. A change in S (solitary wave)/N (dB) of recording layer as a function of the layer thickness of the underlayer was determined. The results are shown as a graph in FIG. 12. As can be seen from the results, satisfactory S (solitary wave)/N (not less than 30 dB) could be provided at an underlayer thickness of about 15 to 60 nm with the maximum S (solitary wave)/N being provided at an underlayer thickness of about 30 to 40 nm.

Figure 13:
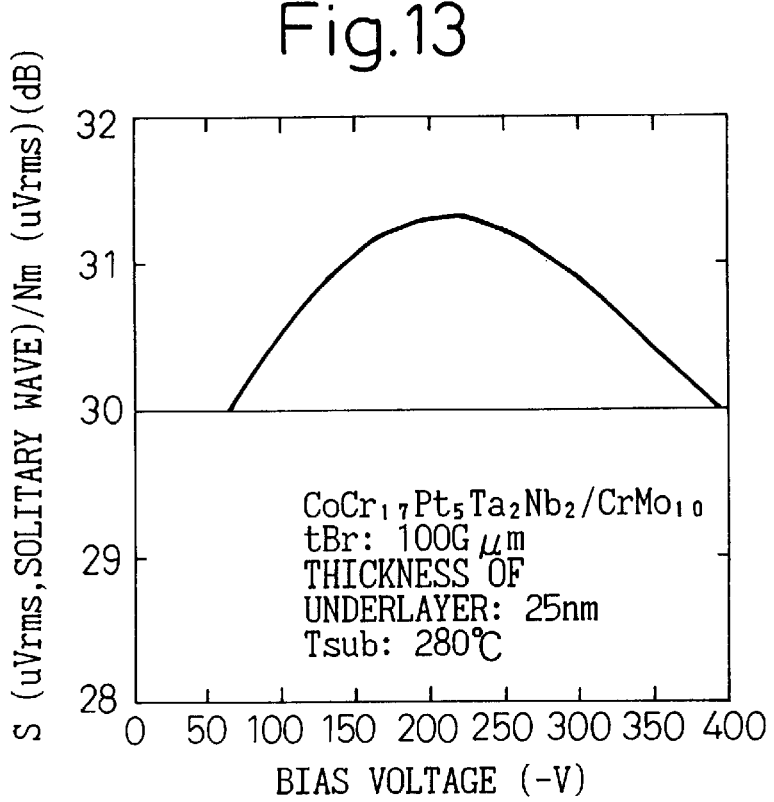
FIG. 13 is a graph showing the dependency of S (solitary wave)/N of a recording layer of CoCr$_{17}$Pt$_5$Ta$_2$Nb$_2$ (at %) upon DC bias voltage.

Evaluation Test 9
Dependency of S (solitary wave)/N of Recording Layer of $CoCr_{17}Pt_5Ta_2Nb_2$ (at %) upon DC Bias Voltage A recording layer of $CoCr_{17}Pt_5Ta_2Nb_2$ (at %) was formed on a 25 nm-thick underlayer of $CrMo_{10}$ under the application of various bias voltages (−V) to determine a change in S (solitary wave)/N (dB) of recording layer as a function of the bias voltage. The results are shown as a graph in FIG. 13. As can be seen from the results, satisfactory S (solitary wave)/N (not less than 30 dB) could be provided at a bias voltage of −70 to −400 V with the maximum S (solitary wave)/N being provided at a bias voltage of about −200 V.

Figure 14:
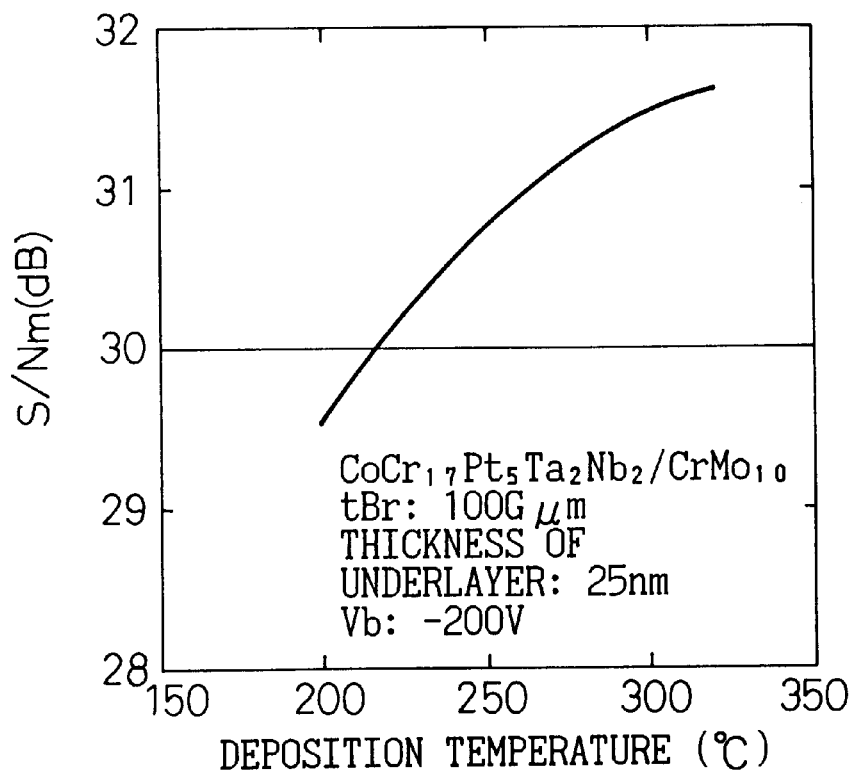
FIG. 14 is a graph showing the dependency of S (solitary wave)/N of a recording layer of CoCr$_{17}$Pt$_5$Ta$_2$Nb$_2$ (at %) upon layer forming temperature.

Evaluation Test 10
Dependency of S (solitary wave)/N of Recording Layer of $CoCr_{17}Pt_5Ta_2Nb_2$ (at %) upon Layer Forming Temperature A recording layer of $CoCr_{17}Pt_5Ta_2Nb_2$ (at %) was formed on a 25 nm-thick underlayer of $CrMo_{10}$ at various layer forming temperatures to determine a change in S (solitary wave)/N (dB) of recording layer as a function of the layer forming temperature. The results are shown as a graph in FIG. 14. As can be seen from the results, satisfactory S (solitary wave)/N (not less than 30 dB) could be provided at a layer forming temperature of 220° C. or above, and S/N improves as the layer forming temperature increases.

Example 2
Production of Magnetic Disk Device

Figure 15:
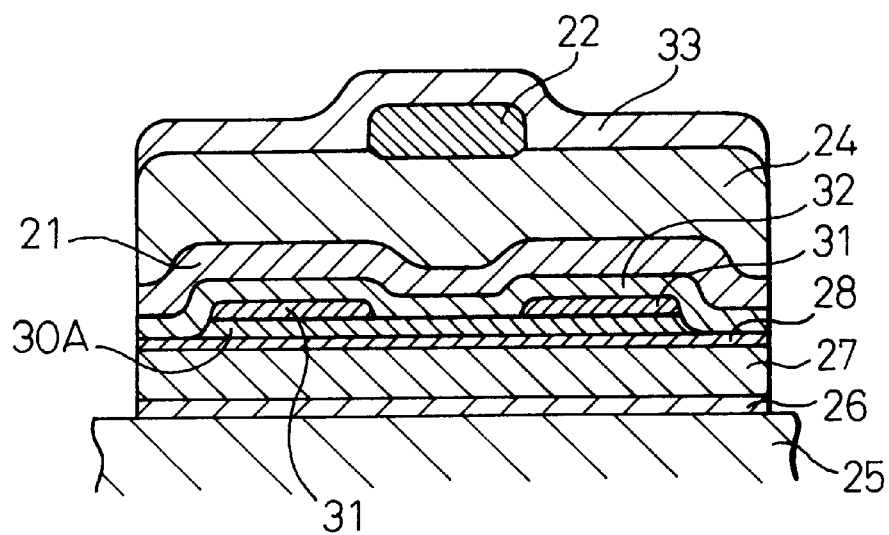
FIG. 15 is a cross-sectional view showing a preferred embodiment of the magnetic disk device according to the present invention.
Figure 16:
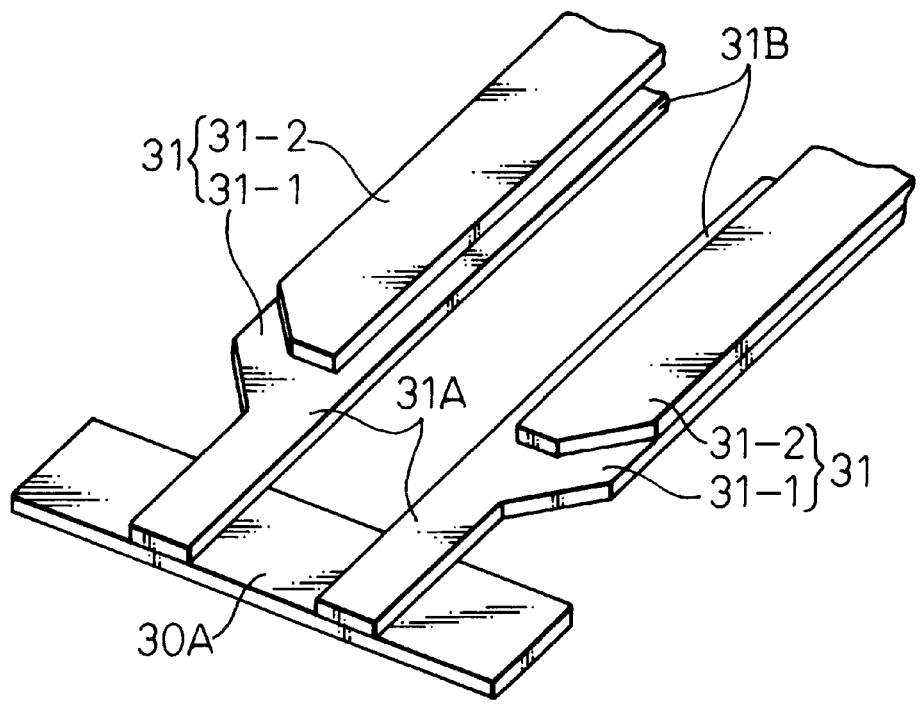
FIG. 16 is a perspective view showing a magnetoresistor section and a conductor layer in the magnetic disk device according to the present invention.

FIG. 15 is a cross-sectional view of one embodiment of the magnetic disk device according to the present invention, and FIG. 16 is a perspective view of a magnetoresistor section and a conductor layer in the magnetic disk device shown in FIG. 15. In the embodiment shown in these drawings, the thickness of the conductor layer 31 is small in its portion 31A in the vicinity of the magnetoresistor section 30A (for example, the thickness of not more than 1200 Å; the smaller the thickness, the better the results) with the thickness of the other portion 31B being large (for example, the thickness of 3000–4000 Å or 2 to 4 times larger than the thickness of the portion 31A in the vicinity of the magnetoresistor section 30A).

The adoption of a multi-layer structure in the conductor layer 31 is effective for the formation of the portion 31B, other than the portion in the vicinity of the magnetoresistor section 30A, in a large thickness. In the present embodiment, as shown in FIG. 16, the conductor layer 31 has a two-layer structure. The first layer 31-1 (for example, thickness of not more than 1200 Å) is first formed, and the second layer 31-2 (for example, thickness of 1800–2200 Å) is then laminated on only the portion 31B of the first layer 31-1.

In the present embodiment, the operation of recording/reproduction of information is mostly the same as that in the prior art. Specifically, when information is recorded on the magnetic recording medium, a current is allowed to flow through the coil in the recording head section to create a magnetic flux in the magnetic poles 21, 22. This results in the creation of a leakage magnetic flux in the recording gap portion of the magnetic poles 21, 22 to conduct recording of information on the magnetic recording medium.

On the other hand, reading of information from the magnetic recording medium is performed by taking advantage of a difference in electric resistance of the magnetoresistor section 30A between the case where an external magnetic field is applied from the magnetic recording medium and the case where no external magnetic field is applied from the magnetic recording medium. Specifically, a change in resistance in the magnetoresistor section 30A is detected through the conductor layers 35, 36, and thus the magnetic head can output a reproducing signal originating from said change in resistance.

In the present embodiment, since the thickness of the conductor layer 31 is small in the portion 31A in the vicinity of the magnetoresistor section 30A, the curving of the lower magnetic pole (upper shield layer) 21 and the like is small. By virtue of this, the recording gap facing the magnetic recording medium is also not significantly deformed. Therefore, even though the position, on a track, of the magnetic head at the time of information recording is somewhat different from the position, on the track, of the magnetic head at the time of reading of the information, the magnetic disk device can accurately read information, making it possible to avoid a problem that reading errors occur despite a small off-track error.

On the other hand, since the thickness and width of the conductor layer 31 is large in the portion 31B, other than that in the vicinity of the magnetoresistor section 30A, the resistance of the whole conductor layer 31 can be reduced. For example, the resistance about 10 Ω in the prior art can be easily reduced to about 7 to 8 Ω. As a result, a change in resistance of the magnetoresistor section 30A can be detected with a high sensitivity, resulting in improved S/N ratio. Further, generation of heat in the conductor layer 31 can also be avoided, preventing the creation of noise attributable to the generation of heat.

In the above embodiment, the conductor layer 31 in its portion 31B in the vicinity of the magnetoresistor section 30A has a large thickness and width. Alternatively, in the portion 31B, only the thickness may be increased without increasing the width. Further, the position of the connection of the conductor layer 31 is not limited to the position shown in FIG. 16 and may be any position so far as a sense current may be allowed to flow in a predetermined direction.

A number of magnetic heads as described above can be formed on a ceramic head substrate by using the thin film forming method. Thereafter, the head substrate is taken off for each head and worked into a desired shape to provide a slider, provided with a magnetic head, shown in FIG. 17. In the slider 40 shown in FIG. 17, rails 41, 42 for creating floating force along the direction of an air stream created by the rotation of the magnetic recording medium are provided on the face opposite to the magnetic recording medium of the slider 40. Inclined faces 41a, 42a are formed on the air inflow side of the floating face of the rails 41, 42, and the magnetic head 45 shown in FIG. 15 is provided on the rear end face of the rail 42 in the slider 40.

Figure 17:
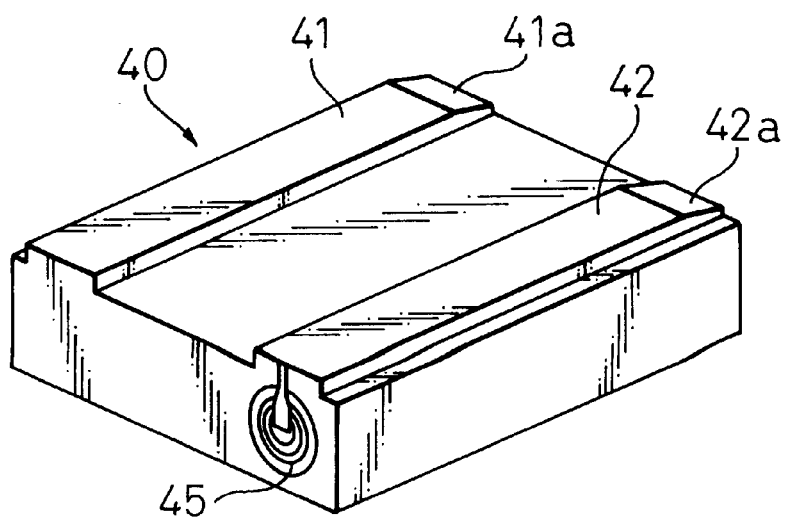
FIG. 17 is an explanatory perspective view of a slider provided with a magnetic head.

The present embodiment of the magnetic disk device comprises a magnetic head and a slider shown in FIG. 17. The present embodiment of the magnetic disk device will be further described.

Figure 18:
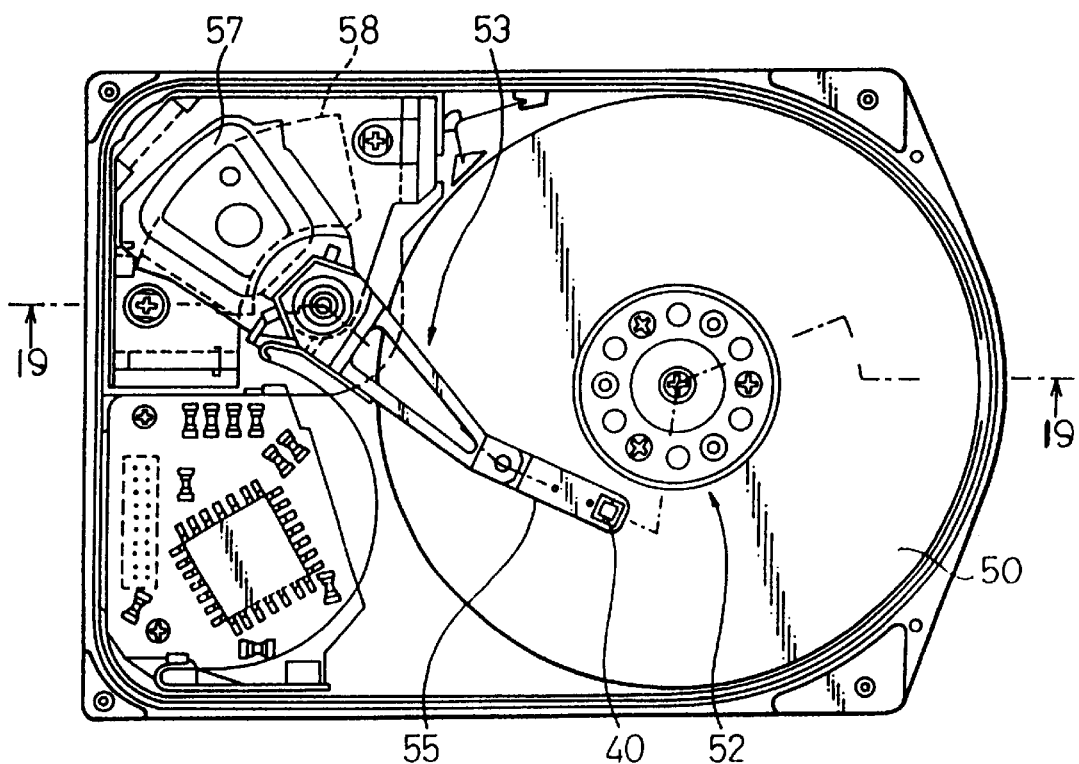
FIG. 18 is a plan view of a magnetic disk device using the slider, provided with a magnetic head, shown in FIG. 17.
Figure 19:
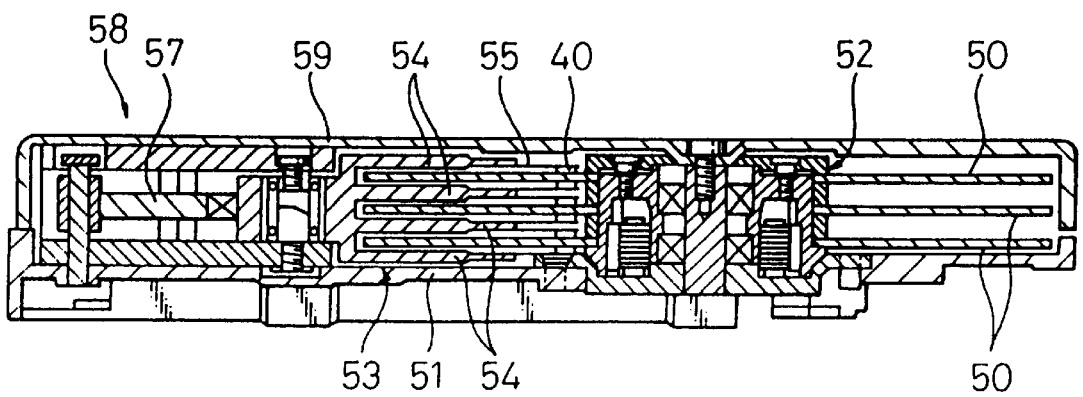
FIG. 19 is a cross-sectional view taken on line A—A of the magnetic disk device shown in FIG. 18.

FIG. 18 is a plan view of a magnetic disk device (with a cover removed) using the slider, provided with a magnetic head, shown in FIG. 17, and FIG. 19 is a cross-sectional view taken on line A—A of FIG. 18.

In these drawings, numeral 50 designates a plurality of magnetic disks (three disks for the present embodiment) as a magnetic recording medium which is rotated and driven by means of a spindle motor 52 provided on a base plate 51.

Numeral 53 designates an actuator rotatably provided on the base plate 51. A plurality of head arms 54, which is extended toward the recording face of the magnetic disk 50 are provided on one end of the actuator 53. A spring arm 55 is rotatably mounted on the end of the head arm 54, and, further, the above slider 40 is inclinably mounted through an insulating layer (not shown) on the flexure section of the spring arm 55. On the other hand, a coil 57 is provided on the other end of the actuator 53.

A magnetic circuit 58 constituted by a magnet and a yoke is provided on the base plate 51, and the coil 57 is disposed within the magnetic gap of the magnetic circuit 58. The magnetic circuit 58 and the coil 57 constitute a moving coil type linear motor (VCM: voice coil motor). The upper surface of the base plate 51 is covered with a cover 59.

The operation of the magnetic disk device having the above construction will be described. When the magnetic disk 50 is in a stopped state, the slider 40 is in contact with a siding zone and in a stopped state of the magnetic disk 50.

When the magnetic disk 50 is rotated and driven at a high speed by means of a spindle motor 52, an air stream created by the rotation of the magnetic disk 50 permits the slider 40 to float from the disk surface while leaving a very small space between the slider and the disk surface. In this state, the flow of a current through the coil 57 creates thrust in the coil 57, rotating the actuator 53. This permits the head (slider 40) to be moved on a desired track of the magnetic disk 50 to conduct reading/wiring of data.

In this magnetic disk device, the conductor layer in the magnetic head has a small thickness in the vicinity of the magnetoresistor section with the thickness of the other portion being large. This construction reduces the curving of the magnetic pole of the recording head section and, at the same time, lowers the resistance of the conductor layer and, in the case of small off-track, enables information to be read with high accuracy and high sensitivity.

As is apparent from the foregoing description, the present invention provides a magnetic recording medium which has a high S/N ratio by virtue of a lowered noise level of the medium while maintaining a high reproduction output and, at the same time, can realize high-density recording by virtue of high coercive force. Further, use of this magnetic recording medium in a magnetic recording device provided with a magnetoresistive head as a magnetic head realizes improved magnetic recording.

I claim:

1. A magnetic recording medium comprising:

a nonmagnetic substrate; and provided on the nonmagnetic substrate in the following order, an underlayer of a nonmagnetic material and a recording layer of a magnetic material;

the underlayer including chromium as a major component and molybdenum as a minor component;

the recording layer including:

| | |
|---|---|
| cobalt | 56 to 78 at %, |
| chromium | 14 to 22 at %, |
| platinum | 4 to 20 at %, and |
| a sum of tantalum and niobium | 0.5 to 4 at %[,]; | the recording layer further having a coercive force Hc of more than 2000 Oe, and having a tBr (a product of the thickness t and the residual magnetization density Br of the recording layer) of 40 to 200 G.$\mu$m.

2. The magnetic recording medium according to claim 1, wherein tantalum and niobium are contained in the same amount in the recording layer.

3. The magnetic recording medium according to claim 1 or 2, wherein the underlayer has a thickness of 15 to 60 nm.

4. The magnetic recording medium according to any one of claims 1 or 2, wherein the underlayer and the recording layer are both formed by sputtering under the application of a DC negative bias of −70 to −400 V to the substrate.

5. The magnetic recording medium according to any one of claims 1 or 2, wherein the nonmagnetic substrate is a NiP-plated aluminum disk and the magnetic recording layer is formed by sputtering at a layer formed temperature of 220 to 320° C.

6. The magnetic recording medium according to any one of claims 1 or 2, which further comprises a protective layer of carbon.

7. A magnetic disk device comprising:

a recording head section for recording information in a magnetic recording medium; and a reproducing head section for reproducing information;

the magnetic recording medium having a nonmagnetic substrate, and provided on the nonmagnetic substrate in the following order, an underlayer of a nonmagnetic material and a recording layer of magnetic material, the underlayer comprising chromium as a major component and molybdenum as a minor component, the recording layer including:

| | |
|---|---|
| cobalt | 56 to 78 at %, |
| chromium | 14 to 22 at %, |
| platinum | 4 to 20 at %, and |
| a sum of tantalum and niobium | 0.5 to 4 at %, | the recording layer further having a coercive force Hc of more than 2000 Oe, and having a tBr (a product of the thickness t and the residual magnetization density Br of the recording layer) of 40 to 200 G.$\mu$m, and the reproducing head section being provided with a magnetoresistive head.

8. The magnetic disk device according to claim 7, wherein the magnetoresistive head is an AMR head or a GMR head.

* * * * *